United States Patent [19]

Levine et al.

[11] 4,315,612
[45] Feb. 16, 1982

[54] FISHING ROD EXTENDER

[76] Inventors: Benjamin Levine, Rte. 5, Box 1230-34; Willis J. Belfield, P.O. Box 937, both of Sequim, Wash. 98382

[21] Appl. No.: 37,817

[22] Filed: May 10, 1979

[51] Int. Cl.³ .......................................... A01K 97/10
[52] U.S. Cl. ............................... 248/538; 248/281.1; 248/520
[58] Field of Search ................. 248/280.1, 281.1, 291, 248/514, 515, 518, 534, 540, 585–587, 520, 538

[56] References Cited

U.S. PATENT DOCUMENTS

| | | | |
|---|---|---|---|
| 592,050 | 10/1897 | Freeland | 248/514 |
| 1,050,672 | 1/1913 | Macintosh | 248/281.1 |
| 2,470,284 | 5/1949 | Bergmans | 248/280.1 |
| 2,502,684 | 4/1950 | Ward | 248/515 |
| 3,883,105 | 5/1975 | Matsumoto | 248/281.1 |

FOREIGN PATENT DOCUMENTS 450692  9/1927  Fed. Rep. of Germany ...... 248/514

*Primary Examiner*—J. Franklin Foss
*Attorney, Agent, or Firm*—Roy E. Mattern, Jr.

[57] ABSTRACT

A fishing rod extender adjustably holds a fishing rod on the side of a fishing boat. The fishing rod is retained in either an extended position during fishing or withdrawn in a retracted position closer to the boat when adjusting the reel, etc. The extending and retracting motion is undertaken by using a parallelogram frame or linkage pivotally attached at each of its four corners, having a base frame member or link rigidly mounted at an angle to the deck of a boat, and having the top frame or link member, parallel to the base, to move transversely in and out as the two interconnecting parallel frames or links rotate. A cylindrical collar attached to the top link near its outboard end receives the handle of the fishing rod.

3 Claims, 3 Drawing Figures

FISHING ROD EXTENDER

BACKGROUND OF THE INVENTION

While fishing from a boat, a fishing rod when not hand held while fishing is at selected times inserted into a one position rod holder to free the fisherman for other activities such as maneuvering the boat. Generally clear working space is at a premium in a small boat, so the location of the rod holder poses a problem. If it is mounted outside the boat, both to clear the interior of obstructions and to extend the fishing line outwardly to minimize line fouling, then insertion and retrieval of the fishing rod becomes difficult, often being done by leaning out over the side of the boat and thereby also increasing the danger of dropping the fishing rod overboard. If on the other hand the rod holder is mounted far enough in relative to the side of the boat, so insertion and retrieval and reel adjustment are readily accomplished, then valuable inboard operating space is wasted, and also the extended trolling fishing lines are more prone to entanglement.

In contrast, this fishing rod extender is easily operated to be pulled inwardly, toward the center line of the boat, where the fishing rod is safely inserted and the reel adjusted, and then pushed outwardly to an extended position during fishing. Also when maneuvering the boat in a congested situation among other boats, additional clearance between lines of boats is quickly obtained, without removing the fishing rods, but only by moving the rod holder to its retracted position nearer the center line of the boat.

In the past adjustable fishing rod holders have been provided, such as those illustrated and described in U.S. Pat. Nos. 2,502,684; 3,311,332 and 3,601,919 which adjustably position a fishing rod relative to the centerline of the boat. However, these prior art fishing rod holders have not utilized the advantages of a parallelogram linkage or composite frame with the two stable end positions of full retraction and extension.

SUMMARY OF THE INVENTION

During fishing, when a fishing rod is held by the fishing rod extender, in the retracted position, a fisherman easily inserts his fishing rod handle into the cylindrical collar and adjusts his reel and line without the danger of dropping the fishing rod overboard and without awkwardly leaning his body out over the side of the boat. When ready, the fishing rod in the fishing rod extender is moved outwardly into the stable extended parallelogram position, making any additional locking means unnecessary. At all times the fishing rod is maintained at the same elevated angle, during extension and retraction, and is thereby prevented from being slipped, dropped, or jerked from the collar of the fishing rod extender. When extended, the fishing rod extender, in effect increases the effective length of a fishing rod or pole, and thereby more widely separates fishing lines, held by such fishing rod extenders from each side of a fishing boat. While so positioned the interior of the boat is more accessible. When necessary to operate the fishing reel again, or to clear lines from a passing boat, the fishing rod extender is quickly and conveniently retracted.

DRAWINGS OF THE PREFERRED EMBODIMENT

A preferred embodiment of the invention is illustrated in the accompanying drawings, wherein:

FIG. 1 shows fishing rod extenders mounted on each side of a boat, holding a fishing rod or pole and reel in a retracted position and being serviced by a fisherman, on the port side, and in an extended, unattended, fishing position, on the starboard side.

FIG. 2, in a front view, illustrates the parallelogram frame or linkage of the fishing rod extender at a movement position enroute to its extended position utilizing the pivotal attachments at each of the four corners and holding the fishing rod handle in a cylindrical collar mounted to the top linkage member, with a mounting bracket attached to the bottom linkage member to be also secured to the deck or other structure of a boat.

FIG. 3 is a side view, of the fishing rod extender in the same movement position illustrated in FIG. 3, illustrating the partial side by side parallelogram linkage or frame structure to receive at the top the fishing pole handle in a cylindrical collar and to be secured at the bottom with a bracket to the boat.

DESCRIPTION OF THE PREFERRED EMBODIMENT OF THE INVENTION

Figure 1:
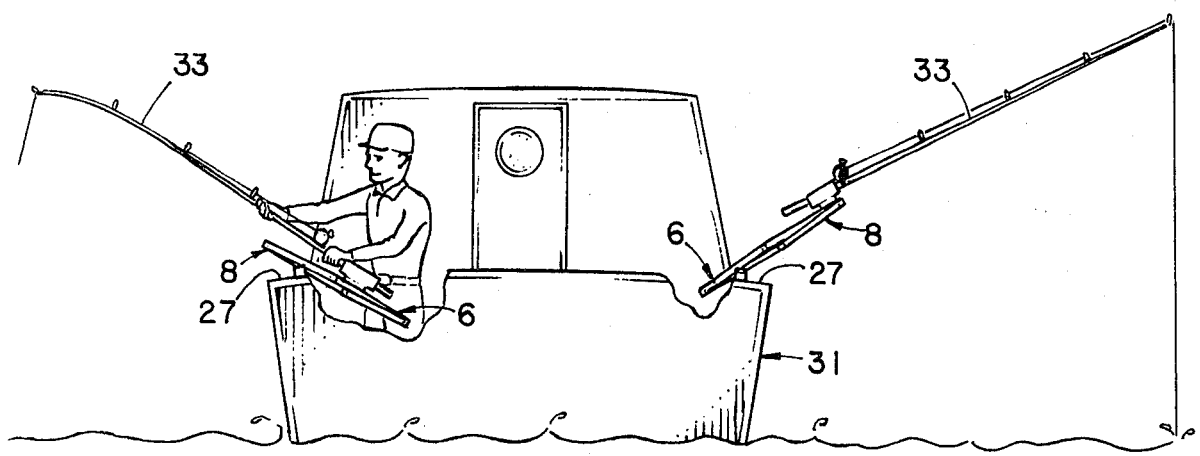
Figures 2, 3:
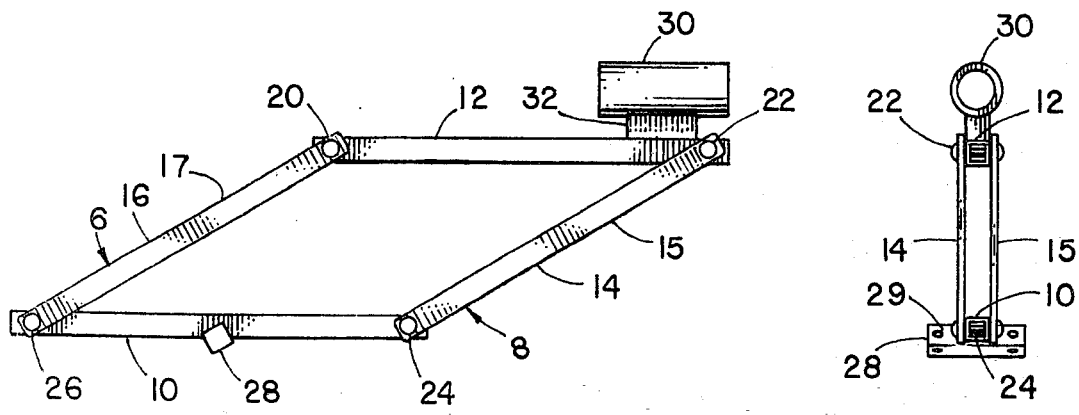

The preferred embodiment of the fishing rod extender is illustrated in FIGS. 1, 2 and 3. In moving from an inboard position to an outboard position, the fishing rod extender 6 utilizes a parallelogram linkage or frame structure 8 having a base link 10 made of a hollow square material, a top link 12 made from like material and positioned parallel to the base link 10, and four alike supporting links 14, 15, 16, and 17 made of bar material and arranged in spaced pairs on opposite sides and ends of the top and base links and pivotally attached to them to perform the parallelogram pivoting movement. The pivotal attachment of the parallelogram linkages 8 is accomplished by using elongated rivets 20, 22, 24 and 26 serving as pivot pins inserted through oversized holes.

A bracket 28 of solid bar material is welded to the base link 10 and holes 29 through it receive bolts, not shown, to mount the fishing rod extender 6 to the deck 27 of a boat 31. The bracket 28 is welded at an angular position and when bolted to the deck 27, the base link 10 is positioned upwardly at an angle relative to the deck 27. The likewise parallel position of top link 12 on which the fishing rod handle cylindrical collar holder 30 is secured, thereby insures the fishing rod 33, will not unintentionally be removed from the fishing rod extender 6. The fishing rod handle 30 has its cylindrical collar secured to a base 32, in turn attached to the top link 12 close to its outboard end.

We claim:

1. A fishing rod extender to be mounted on a boat to slidably receive the handle of a fishing rod on an incline and thereafter while remaining inclined to be manipulated to move an assembly of a fishing rod, reel, line, and lure transversely both toward and away from the centerline of a boat moving the rod and reel inwardly for adjustments and/or removal, and outwardly during fishing periods, to clear the fishing line farther away from the boat, comprising:

(a) a parallelogram linkage for securement at its bottom link to a mounting means;

(b) a fishing rod handle slidable receiving means secured at its bottom to the top link at one end thereof of the parallelogram linkage, the extending of the parallelogram in one direction toward the centerline of the boat placing the reel and handle of the fishing rod in a convenient stable inboard position for adjustment and removal by a fisherman, and in the other direction for placement outboard in a stable fishing position, and (c) a mounting means secured to the bottom link of the parallelogram linkage and comprising an element having fastener receiving openings and a support engaging surface positioned at an acute angle relative to the longitudinal axis of the bottom link, and adapted to be removably secured to a boat near one side and arranged to position the bottom link of the parallelogram linkage on an incline at an upwardly directed angle, and consequently so positioning the top link of the parallelogram linkage, the fishing rod handle slidable receiving means, and any inserted fishing rod handle and rod thereby always keeping the fishing rod in place until it is intentionally removed by the fisherman.

2. A fishing rod extender, as claimed in claim 1, wherein the fishing rod handle slidable receiving means is secured near the outboard end of the top link of the parallelogram linkage.

3. A fishing rod extender, as claimed in claim 2, wherein the parallelogram linkage is secured at a mid length location along its bottom link to the mounting means.

* * * * *